United States Patent
Loui et al.

(10) Patent No.: US 10,788,568 B1
(45) Date of Patent: Sep. 29, 2020

(54) INSTANTANEOUS ULTRA-WIDEBAND SENSING USING FREQUENCY-DOMAIN CHANNELIZATION

(71) Applicant: National Technology & Engineering Solutions of Sandia, LLC, Albuquerque, NM (US)

(72) Inventors: Hung Loui, Albuquerque, NM (US); Brianna Maio, Las Cruces, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 289 days.

(21) Appl. No.: 16/025,843

(22) Filed: Jul. 2, 2018

(51) Int. Cl.
  *G01S 13/10* (2006.01)
  *G01S 7/295* (2006.01)
  *G01S 13/02* (2006.01)

(52) U.S. Cl.
  CPC .......... *G01S 7/295* (2013.01); *G01S 13/0209* (2013.01)

(58) Field of Classification Search
  CPC ...... G01S 13/106; G01S 13/286; G01S 13/30; G01S 7/034; G01S 7/282
  See application file for complete search history.

(56) References Cited

U.S. PATENT DOCUMENTS

| | | | |
|---|---|---|---|
| 5,999,573 A | 12/1999 | Zangi | |
| 6,363,107 B1* | 3/2002 | Scott | H04B 1/70755 370/515 |
| 6,898,235 B1 | 5/2005 | Carlin et al. | |
| 6,901,112 B2 | 5/2005 | McCorkle et al. | |
| 7,206,334 B2 | 4/2007 | Siwiak | |
| 7,253,761 B1 | 8/2007 | Hoyos et al. | |
| 7,436,912 B2 | 10/2008 | Fudge et al. | |
| 2014/0327570 A1* | 11/2014 | Beyer | G01S 13/951 342/26 R |
| 2014/0340159 A1* | 11/2014 | Schmid | H03F 1/565 330/306 |
| 2015/0032411 A1* | 1/2015 | Hoferer | G01F 23/2962 702/154 |

FOREIGN PATENT DOCUMENTS

WO  WO-2016204665 A1 * 12/2016 .......... G01S 13/286

\* cited by examiner

*Primary Examiner* — Timothy A Brainard
(74) *Attorney, Agent, or Firm* — Madelynne J. Farber; Mark A. Dodd

(57) ABSTRACT

A radar system wherein a radar return is channelized by frequency into a plurality of channels, and each of the channels is sampled by a respective analog-to-digital converter that has a sampling rate less than the Nyquist rate of the radar return. The digitally sampled channel signals are Fourier transformed into the frequency domain, where each of the frequency-domain channel signals is matched-filtered according to a respective partial matched filter. The channel signals are then transformed back to the time domain, whereupon they are added together to generate the impulse response of the radar system responsive to the radar return.

20 Claims, 10 Drawing Sheets

INSTANTANEOUS ULTRA-WIDEBAND SENSING USING FREQUENCY-DOMAIN CHANNELIZATION

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Radar systems generally operate by emitting electromagnetic radiation toward a scene that includes a target, receiving an echoed return of the emitted radiation, and analyzing features of the return to determine some information relative to the target (e.g., position of the target, speed of the target, size of the target, etc.). Typically, a radar return includes echoes from not only the target but also any other objects in the scene. For instance, the scene can be an open field, where the open field includes several trees, a vehicle, and a building. Although the vehicle may be the target of interest, the radar return from the scene will include echoes of the transmitted radar signal from the vehicle, but also the building and the trees. It may be desirable to an operator of the radar to be able to distinguish between objects that are close together, or to identify objects of small size.

In many types of radar systems, such as pulse compression radar, range resolution of the radar is limited by the bandwidth of a transmitted radar pulse, where a greater pulse bandwidth allows finer resolution. When the bandwidth of the transmitted pulse is increased (and consequently the bandwidth of the echo return is increased), a sampling rate required to avoid aliasing the return increases. In ultra wideband applications (e.g., where the bandwidth of the signal is greater than 2 GHz, where the bandwidth is greater than 5 GHz, where the bandwidth is greater than 10 GHz, etc.), high-speed (e.g., greater than 2 gigasamples per second, greater than 10 gigasamples per second, greater than 20 gigasamples per second, etc.) analog-to-digital converters (ADCs) may be able to sample the return signal above the Nyquist rate of the return. Existing high-speed ADCs, however, lose dynamic range when sampling at high frequencies, thereby limiting the dynamic range of conventional ultra wideband radar systems. Furthermore, downstream digital signal processors (DSPs) may be unable to accommodate the high data throughput rates of high-speed ADCs.

SUMMARY

The following is a brief summary of subject matter that is described in greater detail herein. This summary is not intended to be limiting as to the scope of the claims.

Technologies pertaining to wideband remote sensing are described herein. With more particularity, technologies described herein facilitate frequency-based channelization of a radar return wherein each of a plurality of channels is digitally sampled by way of an ADC with a sampling rate below the Nyquist rate of the radar return, and the channels subsequently recombined to obtain a desired return signal.

In an exemplary embodiment, an input signal (e.g., a radar return) is received at a receiver that splits the power of the signal among a plurality of channels. Each of the channels is filtered according to a different filter characteristic such that after filtering each of the channel signals comprises a different range of frequencies in the bandwidth of the input signal. The channels are filtered such that each of the channel signals comprises frequencies that are present in at least one other of the channel signals, thereby ensuring that every frequency present in the bandwidth of the input signal is represented in at least one of the channel signals. Subsequent to the filtering, the channel signals are mixed with respective local oscillator signals and filtered to down-convert the channel signals to respective intermediate frequency (IF) bands. The IF signals are then sampled by ADCs to generate discrete-time representations of the IF signals. Since the IF signals each have smaller bandwidth than the original input signal, the ADCs can have sampling rates below the Nyquist rate of the input signal. For instance, if the input signal has a bandwidth of 1 GHz, and each of the channels has a bandwidth of approximately 100 MHz, the ADCs can have sampling rates less than the 2 GHz Nyquist rate of the input signal and will not cause aliasing as long as their sampling rates exceed the 200 MHz Nyquist rate of the channels.

Once the channel signals are digitally sampled, various digital signal processing operations are performed over the digitized channel signals. With greater particularity, the digitized channel signals are transformed to the frequency domain by performing fast Fourier transforms (FFTs) over the digitized channel signals. The frequency-domain representations of the digitized channel signals are shifted based upon their respective local oscillator signals to their original relative positions after the initial RF filtering.

Subsequently, respective partial matched filters are applied to each of the frequency-domain digitized channel signals. The partial matched filters are based upon a complete matched filter that is defined over the bandwidth of the input signal. In an exemplary embodiment, each of the partial matched filters takes values of the complete matched filter in the range of frequencies represented by the FFT of the channel to which the partial matched filter is applied. The partial-matched-filtered FFTs of the channel signals are then inverse transformed to the time domain and combined to generate a response signal. For instance, the response signal is indicative of a target in the scene where the input signal is a radar return from the scene.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
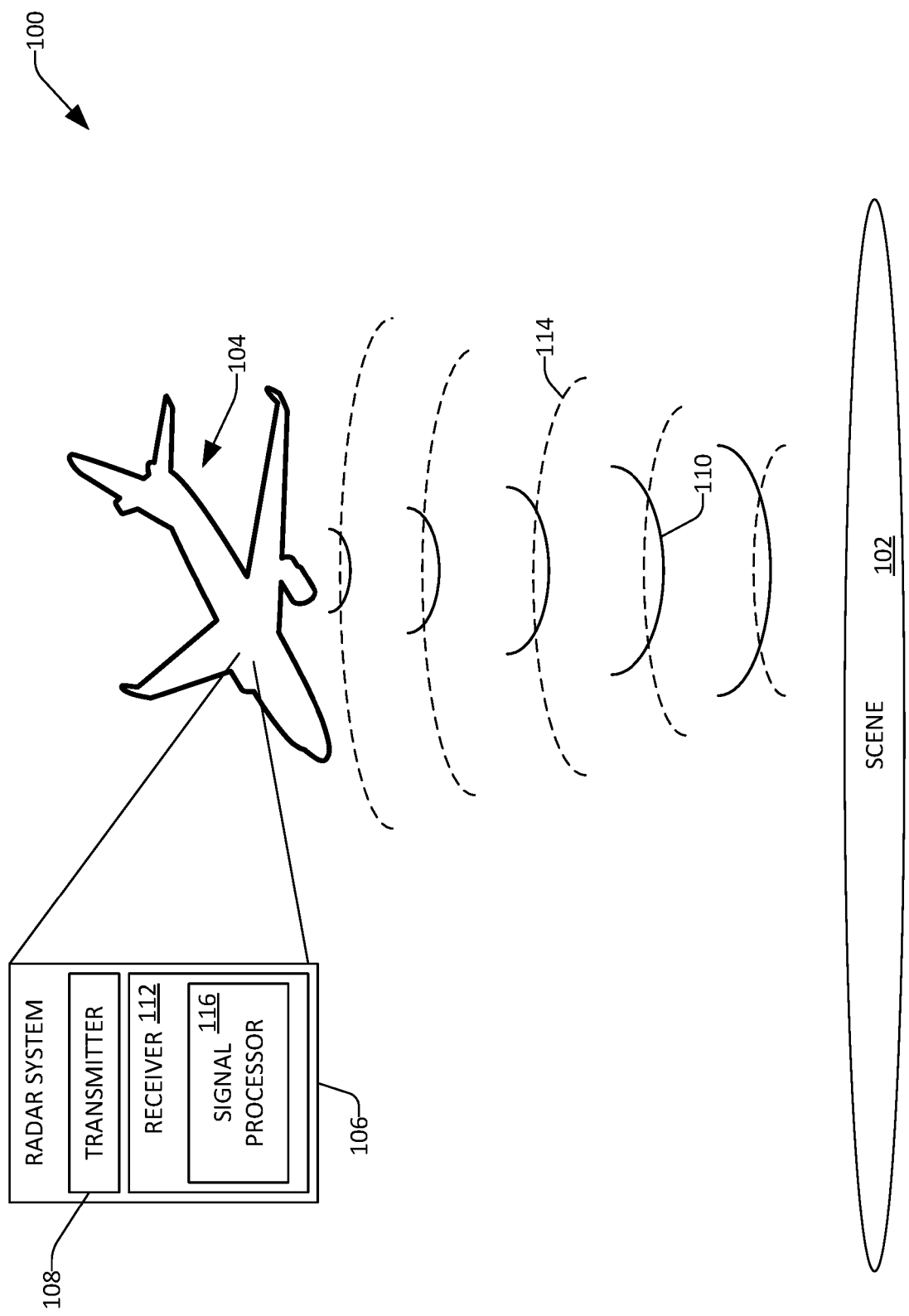
FIG. 1 is a schematic illustrating an exemplary radar system.

Various technologies pertaining to generating an impulse response signal based upon a radar return are described herein. With more particularity, various aspects are described herein relating to digitally processing a radar return that is channelized and sampled below the Nyquist rate of the return. Such aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference now to FIG. 1, an exemplary system 100 configured to perform remote sensing of one or more objects in a scene 102 is illustrated. The system 100 includes an aircraft 104 that includes a radar system 106. The aircraft 104 can be an airplane, an unmanned aeronautical vehicle (UAV), a helicopter, a satellite, etc. The radar system 106 includes a radar transmitter 108 that is configured to emit radar signals 110 (shown in solid line) towards the scene 102. For instance, the radar transmitter 108 includes a transmit antenna that is energized to cause the radar signals 110 to be emitted from the transmitter 108 towards the scene 102. The radar system 106 also includes a radar receiver 112 that is configured to detect radar signals 114 (shown in dashed line) that have reflected from the scene 102. By way of example, the radar receiver 112 includes a receive antenna that receives the reflected radar returns 114 and outputs electrical signals indicative of the returns 114. In other exemplary embodiments, the radar receiver 112 and the radar transmitter 108 share a single radar antenna that is configured to transmit the radar signals 110 and receive the radar returns 114.

The radar receiver 112 can be configured to output data pertaining to one or more objects (e.g., a target) in the scene 102 based upon the received radar returns 114. In some embodiments, the receiver 112 can be configured to output human-interpretable data relative to the one or more objects in the scene 102. For instance, the receiver 112 can be configured to output a range or speed of an object in the scene 102. In other embodiments, the receiver 112 can be configured to output data suitable for further processing by one or more signal processing or computing elements in connection with generating human-interpretable data. By way of example, the receiver 112 can be configured to output an impulse response signal (IPR) based upon the radar returns 114, where the IPR is a conditioned version of the radar return 114 that is more readily analyzed by a computing system to identify one or more features of an object in the scene 102 (e.g., range, speed, etc.).

The radar transmitter 108 can be configured to emit the radar signal 110 such that the radar signal 110 has a wide bandwidth spanning a plurality of frequencies. By way of example, the radar transmitter 108 emits the radar signal 110 with a bandwidth of greater than 2 GHz, greater than 5 GHz, greater than 10 GHz, etc. By way of further example, the radar transmitter 108 can emit a chirp pulse that varies in frequency over time over a bandwidth of multiple GHz. In various exemplary embodiments, the radar transmitter 108 emits a chirp pulse that varies linearly in frequency over time, exponentially in frequency over time, or that has a frequency that varies over time according to a function $f(t)$.

In connection with outputting data pertaining to one or more objects in the scene 102, the receiver 112 can be configured to perform various signal processing operations. The receiver 112 comprises a signal processor 116 that performs various digital and/or analog signal processing operations. In addition to the signal processor 116, the receiver 112 can include additional circuitry configured to perform various signal conditioning and signal processing operations relative to radar signals received by the receiver 112.

Figure 2:
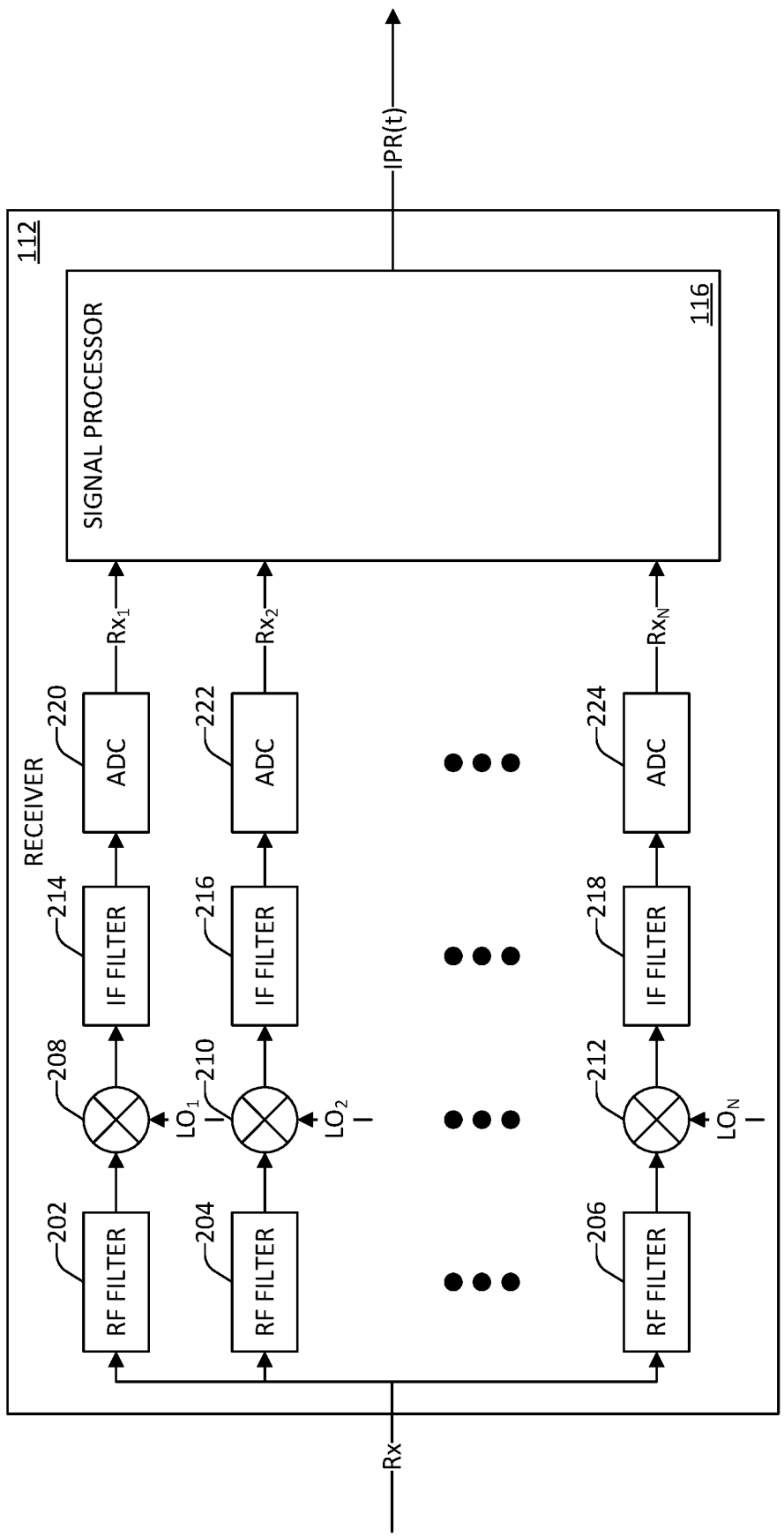
FIG. 2 is a functional block diagram of an exemplary receiver that facilitates sampling of a radar return below the Nyquist rate of the return.

By way of example, and referring now to FIG. 2, a functional block diagram of exemplary aspects of the receiver 112 is illustrated. The receiver 112 receives a radar return signal Rx (e.g., by way of a radar antenna) and outputs a response signal IPR(t), where IPR(t) represents the return of a point target where the width and sidelobe levels conform to desired performance metrics (e.g., resolution, selectivity, etc.). In an example, the complete collection of points in IPR(t) comprises a radar image. The receiver 112 comprises a plurality of RF filters 202-206 (a first RF filter 202 through an Nth RF filter 206), a plurality of mixers 208-212 (a first mixer 208 through an Nth mixer 212), a plurality of IF filters 214-218 (a first IF filter 214 through an Nth IF filter 218), and a plurality of ADCs 220-224 (a first ADC 220 through an Nth ADC 224). The receiver 112 further comprises the signal processor 116.

Upon receipt of the radar return signal Rx, the receiver 112 splits the signal Rx into a plurality of N channel signals $Rx_1$, $Rx_2$ ... $Rx_N$, wherein each of the channel signals $Rx_1$-$Rx_N$ receives a fraction of the power of the return signal Rx. While not depicted in FIG. 2, the receiver 112 may additionally include a plurality of amplifiers configured to amplify each of the N channels in order to improve the signal-to-noise ratio of each of the channel signals $Rx_1$-$Rx_N$ as they propagate through the receiver 112. The channel signals $Rx_1$-$Rx_N$ are respectively received at the RF filters 202-206. The RF filters 202-206 are each configured to pass a different band of frequencies in the bandwidth of the return signal, where each of the bands partially overlaps with at least one other band. Stated differently, the filters 202-206 are configured such that each of the channel signals $Rx_1$-$Rx_N$, subsequent to filtering by the filters 202-206, is representative of the return signal Rx in a different band of frequencies, where each band of frequencies includes at least one frequency from at least one other of the bands.

Figure 3:
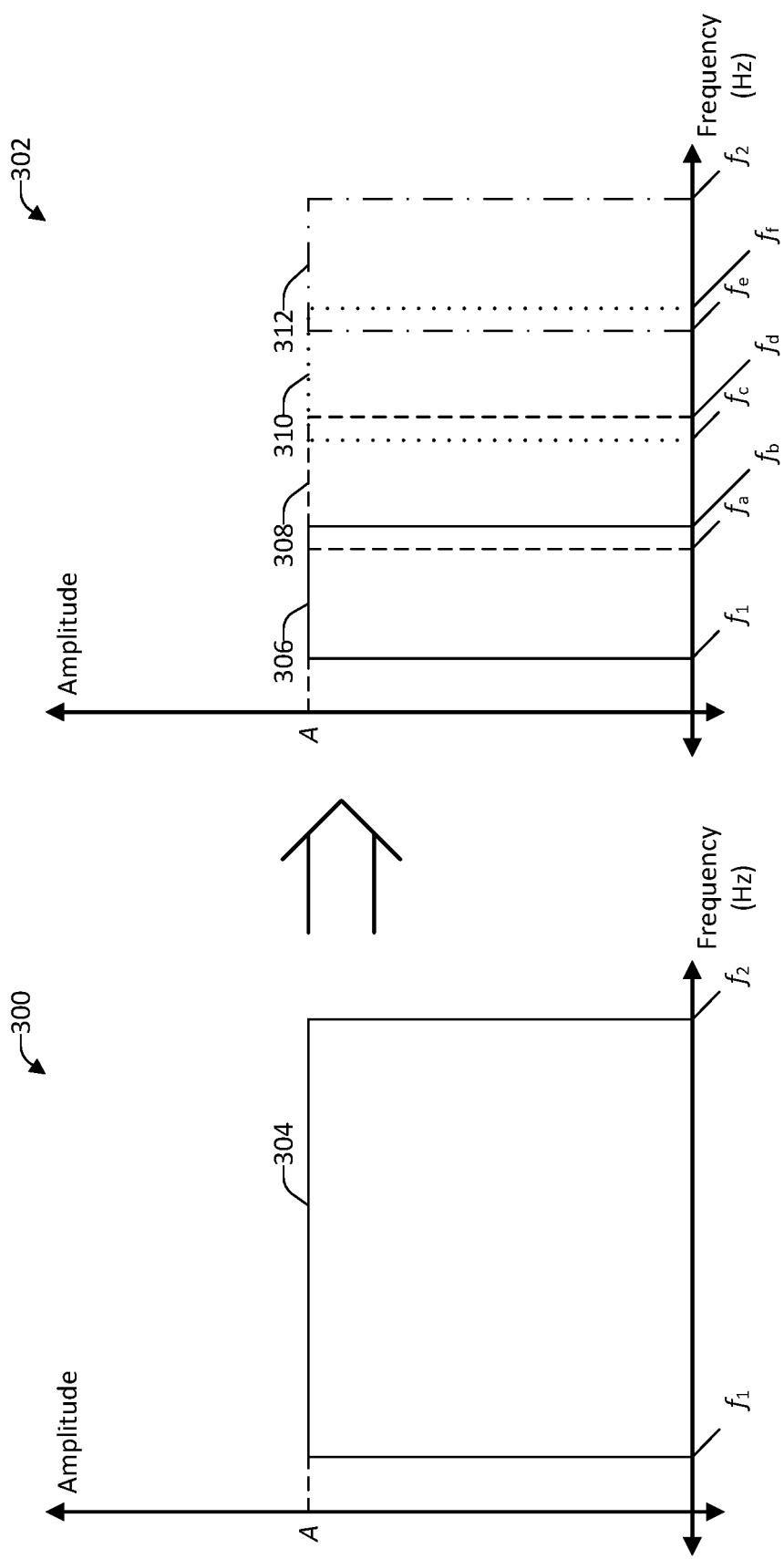
FIG. 3 is a diagram that illustrates channelization of a return signal based on frequency.

By way of example, and referring now to FIG. 3, exemplary diagrams 300, 302 that illustrates frequency-domain channelization of a signal into four channels are illustrated. Diagram 300 illustrates a frequency-domain representation of an input signal 304 that has a constant amplitude between a first frequency $f_1$ and a second frequency $f_2$ and is zero elsewhere. Thus, the signal 304 has a bandwidth of $f_2$-$f_1$. Diagram 302 illustrates a frequency-domain representation of four channelized signals 306-312 that together are representative of the signal 304 throughout the bandwidth $f_2$-$f_1$. The signals 306-312 are selected by appropriate RF filters (e.g., bandpass filters, high-pass filters, low-pass filters, notch filters, etc.) that divide the signal 304 into a plurality of overlapping frequency bands. The channel signal 306 is representative of the signal 304 from frequency $f_1$ to frequency $f_b$, the channel signal 308 is representative of the signal 304 from frequency $f_a$ to frequency $f_d$, the channel signal 310 is representative of the signal 304 from frequency $f_c$ to frequency $f_f$, and the channel signal 312 is representative of the signal 304 from frequency $f_e$ to frequency $f_2$. Channel signals 306 and 308 take the same values from frequency $f_a$ to frequency $f_b$, channel signals 308 and 310 take the same values from frequency $f_c$ to frequency $f_d$, and channel signals 310 and 312 take the same values from frequency $f_e$ to $f_f$. The signals 306-312 can have substantially any amount of overlap. It is to be understood that while the signal 304 and the channel signals 306-312 are shown as having constant amplitude, the signal 304 can be substantially any waveform, and the signals 306-312 take whatever values the signal 304 does at corresponding frequencies.

Referring again to FIG. 2, subsequent to being filtered at the RF filters 202-206, the channel signals $Rx_1$-$Rx_n$ are received at the mixers 208-212 where each of the channel signals $Rx_1$-$Rx_n$ is mixed with a different respective local oscillator signal. The local oscillator signals $LO_1$-$LO_N$ can be generated by the receiver 112. Upon output from the mixers 208-212, the channel signals $Rx_1$-$Rx_N$ are filtered by the IF filters 214-218 to select the desired frequency band. The mixing and IF filtering operations by the mixers 208-212 and IF filters 214-218 facilitate shifting of the channel signals $Rx_1$-$Rx_N$ to lower frequency bands prior to sampling by the ADCs 220-224. For instance, the output of mixer 212 of channel N is a superimposed pair of signals having frequencies $f_{R\times N} \pm f_{LON}$. The Nth IF filter 218 is configured to filter out components of the output of the mixer 212 of $f_{R\times N}+f_{LON}$ such that at the output of the IF filter 218 the channel signal has frequency $f_{R\times N}-f_{LON}$ (where $f_{R\times N}$ varies over time). In an example, the return signal Rx can be a signal that varies in frequency from 10 GHz to 20 GHz and the return signal Rx can be split into two channel signals $Rx_1$ and $Rx_2$, where $Rx_1$ varies in frequency from 10 to 16 GHz and $Rx_2$ varies in frequency from 14 GHz to 20 GHz. In the example, the first channel signal $Rx_1$ can be mixed at the mixer 208 with the first local oscillator $LO_1$ at a frequency of 10 GHz, such that the output of the mixer has components in frequency bands 0 GHz to 6 GHz and 20 GHz to 26 GHz. Subsequently, the first channel signal $Rx_1$ of the example can be filtered at the IF filter 214 to select the frequency band extending from 0 GHz to 6 GHz. It is to be understood that the local oscillator signals $LO_1$-$LO_N$ can be selected to have the same or different frequency values. The frequencies of the local oscillator signals $LO_1$-$LO_N$ can be selected based upon a bandwidth of the return signal Rx, offsets of the frequency bands of the channel signals $Rx_1$-$Rx_N$ from 0 Hz, desired sampling frequencies of the channel signals $Rx_1$-$Rx_N$, etc.

At the outputs of the filters 214-218, the channel signals $Rx_1$-$Rx_N$ are sampled by the ADCs 220-224, respectively, to generate discrete-time versions of the channel signals $Rx_1$-$Rx_N$. As a result of the mixing and IF filtering operations performed at the mixers 208-212 and IF filters 214-218, at the output of each of the IF filters 214-218 the channel signals $Rx_1$-$Rx_N$ are at lower frequencies than at the outputs of the RF filters 202-206. The ADCs 220-224 are therefore able to sample the channel signals $Rx_1$-$Rx_N$ at the outputs of the IF filters 214-218 without aliasing at lower sampling rates than would be required for alias-free sampling at the outputs of the RF filters 202-206. For instance, continuing the example above, the Nyquist rate for sampling the first channel signal $Rx_1$ without aliasing at the output of the IF filter 214 is 12 GHz, whereas the Nyquist rate for sampling the first channel signal $Rx_1$ at the output of the RF filter 202 is 32 GHz. Hence, the ADCs 220-224 sample the channel signals $Rx_1$-$Rx_N$ at sampling rates below the Nyquist rate of the original radar return Rx (e.g., at a rate less than twice the bandwidth of the radar return Rx).

Upon sampling of the channel signals $Rx_1$-$Rx_N$ at the ADCs 220-224, respectively, discrete-time versions of the channel signals $Rx_1$-$Rx_N$ are provided to the signal processor 116 for further processing in connection with generating the radar response signal IPR(t). In an exemplary embodiment, the signal processor 116 is configured to perform matched-filtering based upon the discrete-time channel signals $Rx_1$-$Rx_N$ to generate the response signal IPR(t).

Figure 4:
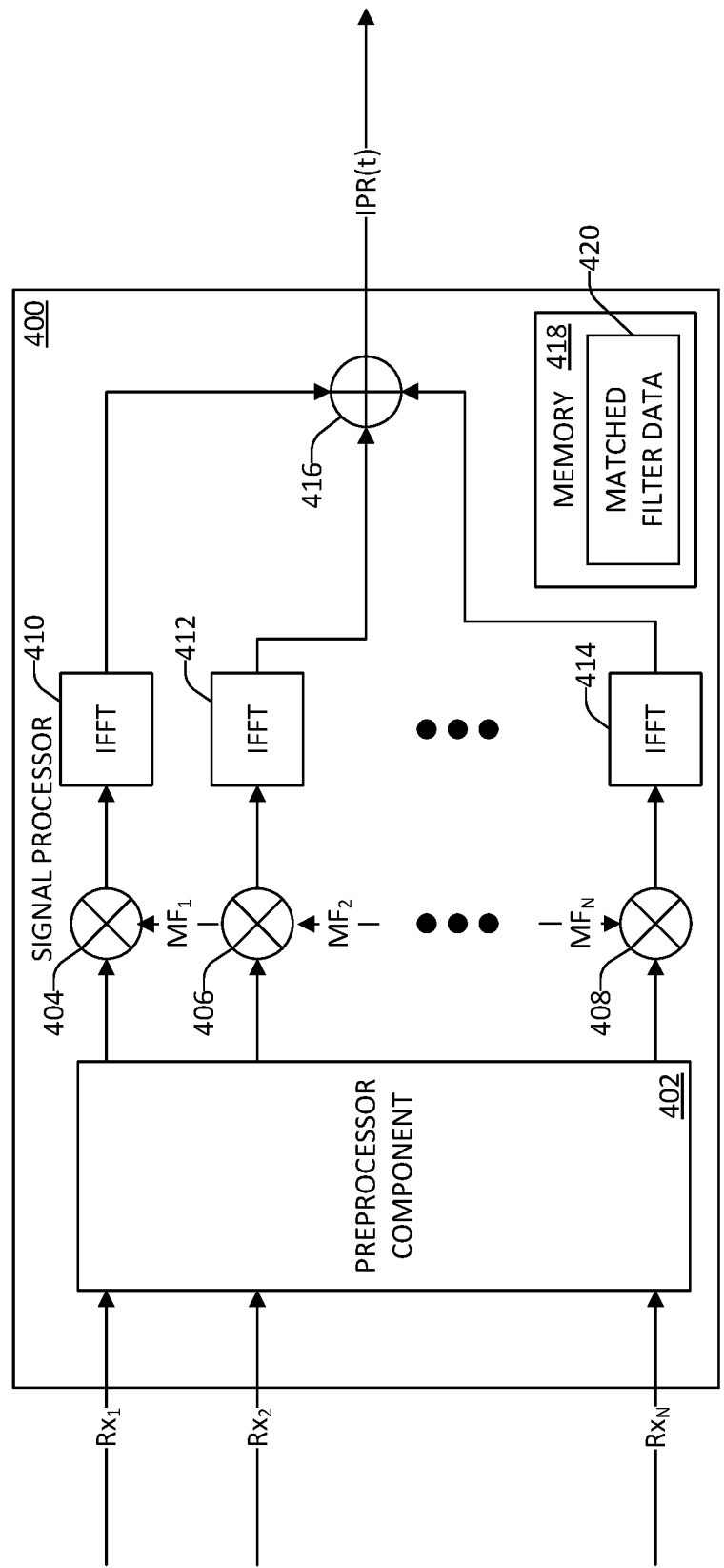
FIG. 4 is a functional block diagram illustrating various details of an exemplary signal processor that facilitates reconstruction of a channelized waveform.

With reference now to FIG. 4, a functional block diagram depicting an exemplary signal processor 400 is shown, wherein the signal processor 116 may be or include the signal processor 400. While various components are illustrated in FIG. 4 as discrete components in the signal processor 400, it is to be understood that the signal processor 400 can comprise configurable (e.g., configurable logic blocks in a field-programmable gate array, or FPGA) or programmable components that are configured to perform functions described as being performed by the illustrated components.

The signal processor 400 includes a preprocessor component 402, a plurality of N multiplier components 404-408 (a first multiplier component 404 through an Nth multiplier component 408), a plurality of inverse fast Fourier transform (IFFT) components 410-414 (a first IFFT component 410 through an Nth IFFT component 414), an adder component 416, and memory 418. The preprocessor component 402 receives the discrete-time channel signals $Rx_1$-$Rx_N$ (e.g., from the ADCs 220-224) and for each of the channel signals $Rx_1$-$Rx_N$ performs a fast Fourier transform (FFT) to transform the channel signals $Rx_1$-$Rx_N$ to the frequency domain. Due to the frequency shifting of the channel signals $Rx_1$-$Rx_N$ by the mixers 208-212 and IF filters 214-218, the FFTs of the channel signals $Rx_1$-$Rx_N$ may be misaligned along the frequency axis from a "true" position of the channel signals $Rx_1$-$Rx_N$ in the frequency domain, as taken at the outputs of the RF filters 202-206, respectively. The preprocessor component 402 shifts the FFTs of the channel signals $Rx_1$-$Rx_N$ to their appropriate IF positions in the frequency domain as compared with the relative positions of the RF bands selected for the channels $Rx_1$-$Rx_N$ by the RF filters 202-206, respectively. Stated differently, the preprocessor component 402 shifts the FFTs of the channel signals $Rx_1$-$Rx_N$ such that for each of the channel signals $Rx_1$-$Rx_N$, its IF frequency domain representation is positioned along the frequency axis at a same position relative to the IF frequency domain representations of the other channel signals $Rx_1$-$Rx_N$ as the frequency domain representations of the channel signals $Rx_1$-$Rx_N$ had at the outputs of the RF filters 202-206.

Figure 5:
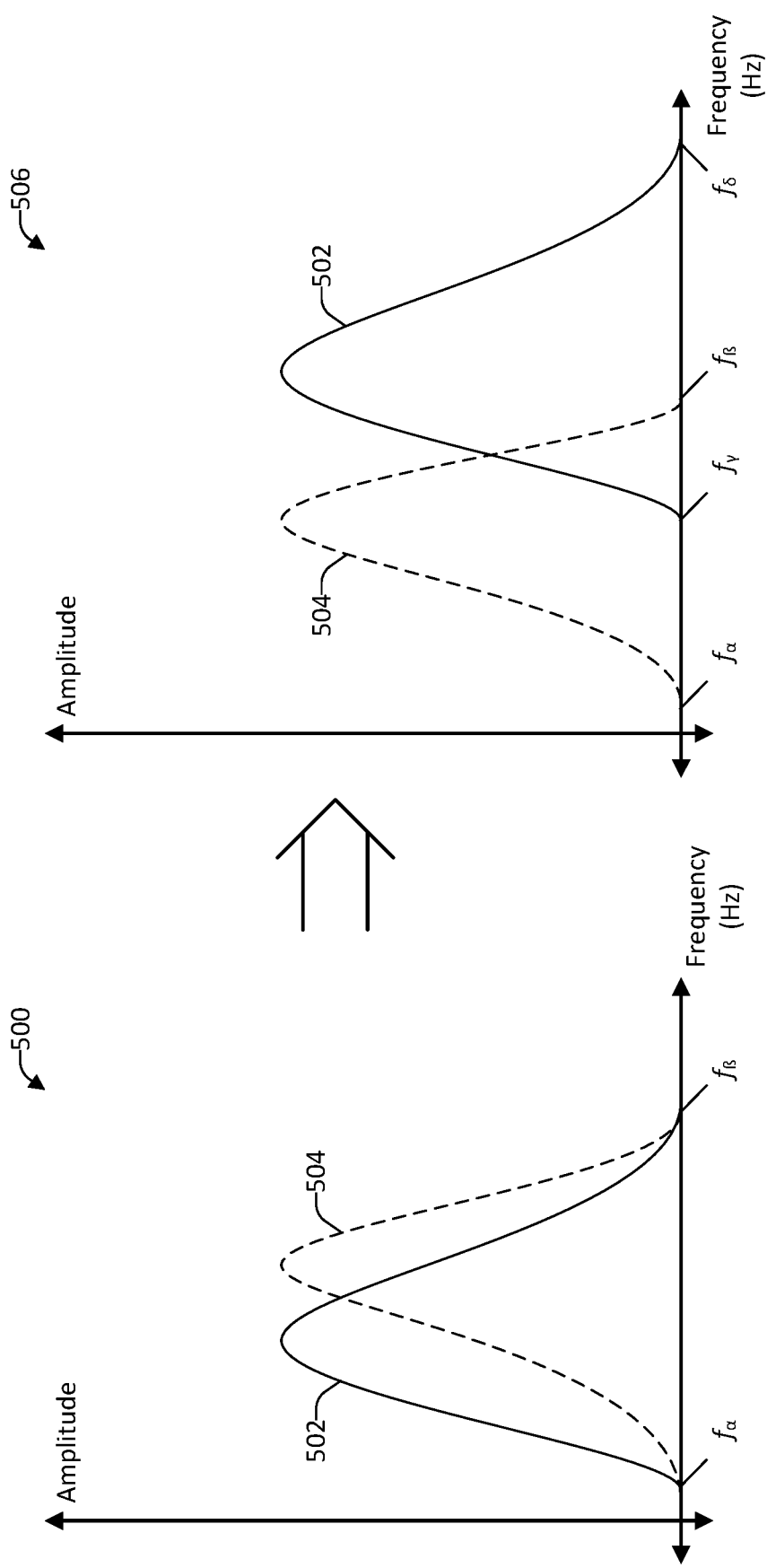
FIG. 5 is a diagram that illustrates shifting of two channel signals from an intermediate frequency band to respective original frequency bands.

For example, and referring now to FIG. 5, a first exemplary diagram 500 is shown that depicts a frequency domain representation of a first signal 502 and a frequency domain representation of a second signal 504, wherein the first signal 502 and the second signal are aligned at a same IF band extending from a frequency $f_\alpha$ to a frequency $f_\beta$. FIG. 5 further depicts a second exemplary diagram 506, wherein the first signal 502 has been shifted to a corrected position at a higher frequency band that extends from a frequency $f_\gamma$ to a frequency $f_\delta$. The frequency band $f_\gamma$ to $f_\delta$ is at a same relative position with respect to the frequency band $f_\alpha$ to $f_\beta$ as the frequency domain representations of the signals 502, 504 had at the outputs of the RF filters 202-206, whereas the absolute positions of the signals 502, 504 along the frequency axis may be different from the absolute positions of the signals 502, 504 along the frequency axis at the outputs of the RF filters 202-206. The relative IF position of the frequency domain representation of the signal 502 is based upon the RF filter in the RF filters 202-206 and the local oscillator in the local oscillator signals $LO_1$-$LO_N$ that belong to the channel through which signal 502 passes. Referring again to FIG. 4, the preprocessor component 402 can perform the shifting based upon the frequencies of the local oscillator signals $LO_1$-$LO_N$ used by the receiver 112 in connection with heterodyning by the mixers 208-212, and the bandwidths of the RF filters 202-206.

The preprocessor component 402 outputs the shifted FFTs of the channel signals $Rx_1$-$Rx_N$ to the multiplier components 404-408. The multiplier components 404-408 receive the shifted FFTs of the channel signals $Rx_1$-$Rx_N$, respectively. The multiplier components 404-408 multiply the shifted FFTs of the channel signals $Rx_1$-$Rx_N$ by a plurality of partial matched filters $MF_1$-$MF_N$. In exemplary embodiments, the partial matched filters $MF_1$-$MF_N$ are based upon matched filter data 420 that is stored in the memory 418 of the signal processor 116.

For instance, the matched filter data 420 can include a calibrated matched filter that is computed in a calibration procedure based upon a test signal. By way of example, the test signal can be a signal with frequency-domain representation $S(\omega)$ that is desirably transmitted by the radar transmitter 108. In the calibration procedure, the time domain representation of the test signal is provided to the receiver 112 (e.g., as shown in FIG. 2 for the radar return Rx). The test signal propagates through the receiver 112 along the channels 1-N as described above with respect to FIGS. 2 and 4 until the shifted FFTs of the channel signals $Rx_1$-$Rx_N$ are computed by the preprocessor component 402, where these FFTs can be written as $S_{1CAL}(\omega), S_{2CAL}(\omega), \ldots S_{NCAL}(\omega)$. The sum of the channels 1-N in the frequency domain is given by:

$$S_{CAL}(\omega) = S_{1CAL}(\omega) + S_{2CAL}(\omega) + \ldots + S_{NCAL}(\omega) \qquad \text{Eq. 1}$$

The matched filter 420 can then be defined as:

$$M_{CAL}(\omega) = \frac{IPR(\omega)}{S_{CAL}(\omega)} \qquad \text{Eq. 2}$$

where $IPR(\omega)$ is the frequency-domain representation of a desired response signal. The matched filter $M_{CAL}(\omega)$ is defined over the bandwidth of $S_{CAL}(\omega)$. The matched filter $M_{CAL}(\omega)$ is defined for a desired $IPR(\omega)$ and a signal $S(\omega)$. Hence, the calibration procedure can be repeated for each different combination of desired $IPR(\omega)$ and desired $S(\omega)$ to be output by way of the transmitter 108, and the resulting matched filter $M_{CAL}(\omega)$ stored as matched filter data 420.

In exemplary embodiments, the partial matched filters $MF_1$-$MF_N$ are based upon the calibrated matched filter $M_{CAL}(\omega)$ and frequency bands passed by the RF filters 202-206. By way of example, and not limitation, each of the partial matched filters $MF_1$-$MF_N$ can be defined over the bandwidth of $M_{CAL}(\omega)$, where the partial matched filter $MF_x$ of the xth channel in the N channels is defined as:

$$MF_x(\omega) = \{M_{CAL}(\omega) \text{ for } \omega_{x1} \leq \omega \leq \omega_{x2}; 0 \text{ else} \qquad \text{Eq. 3}$$

where the bandwidth $\omega_{x1}$ to $\omega_{x2}$ is defined by the IF position of the xth channel signal relative to the xth RF filter in the RF filters 202-206. Prior to outputting the shifted FFTs of the channel signals $Rx_1$-$Rx_N$, the preprocessor component 402 zero-pads the shifted FFTs so that each of the shifted FFTs is defined over the entire bandwidth of the return Rx received at the receiver 112. At the outputs of the multipliers 404-408, the matched-filtered frequency-domain channel signals $Rx_1$-$Rx_N$ are received by the IFFT components 410-414, respectively. Each of the IFFT components 410-414 performs an inverse FFT over the matched-filtered frequency domain channel signal it receives from its corresponding multiplier in the multipliers 404-408. At the outputs of the IFFT components 410-414 are time-domain version of the matched-filtered channel signals $Rx_1$-$Rx_N$, which are summed at the adder component 416. The output of the adder component 416, $IPR(t)$, is the final time-domain response signal for the radar return Rx based upon the matched filter selected from the matched filter data 420.

Figure 6:
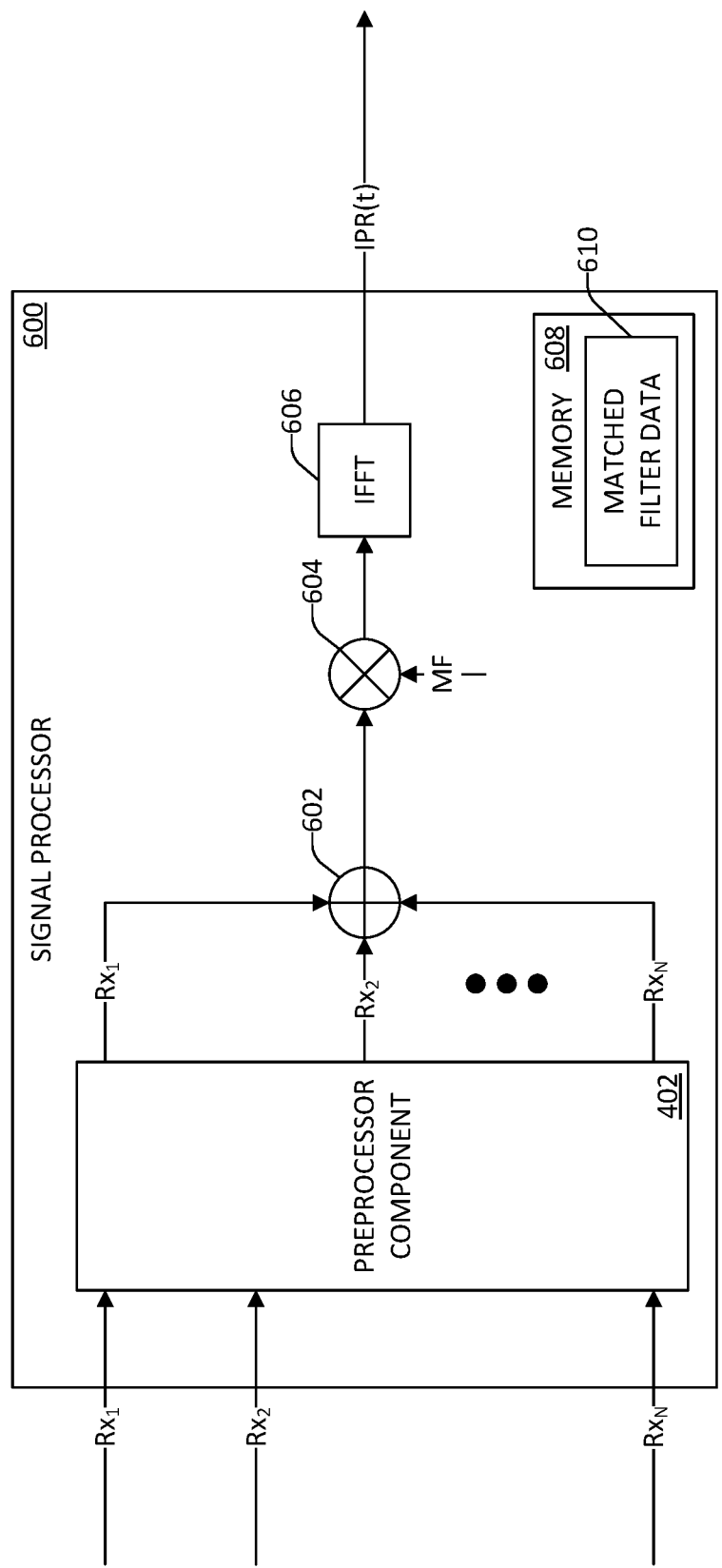
FIG. 6 is a functional block diagram illustrating various details of another exemplary signal processor that facilitates reconstruction of a channelized waveform.

Referring now to FIG. 6, another exemplary signal processor 600 is shown, wherein the signal processor 116 may be or include the signal processor 600. The signal processor 600 includes the preprocessor component 402, an adder component 602, a multiplier component 604, an IFFT component 606, and memory 608 that includes matched filter data 610. The preprocessor component 402 receives the discrete-time channel signals $Rx_1$-$Rx_N$ and computes and shifts their Fourier transforms as described above with respect to FIG. 4. The shifted FFTs of the channel signals $Rx_1$-$Rx_N$ are then output to the adder component 602, which outputs a sum of the shifted FFTs. The sum of the shifted FFTs of the channel signals $Rx_1$-$Rx_N$ is a frequency-domain signal that is received at the multiplier component 604. The multiplier component 604 multiplies the sum of the shifted FFTs by a matched filter, e.g., as indicated in the matched filter data 610. In an exemplary embodiment, the multiplier component 604 multiplies the sum of the shifted FFTs by the matched filter $M_{CAL}(\omega)$ (e.g., computed based upon the calibration procedure described above, and stored in the memory 608 as matched filter data 610). The multiplier component 604 therefore outputs a matched-filtered sum of the shifted frequency-domain representations of the channel signals $Rx_1$-$Rx_N$. This matched-filtered sum is received by the IFFT component 606 which computes the time-domain representation of the matched-filtered sum, which is IPR(t), the final time-domain response signal for the radar return Rx based upon the matched filter selected from the matched filter data 610.

It is to be ascertained that the receiver 112 can include substantially any number of channels. In one example, a number of channels N is selected based upon a desired bandwidth of the radar signal 110 output by the radar transmitter 108 and a desired sampling rate of the ADCs 220-224. Further, it is to be appreciated that the bandwidths of the filters 202-206 need not be identical. In turn, the bandwidths of the filters 214-218 may be different from one another and the sampling rates of the ADCs 220-224 may vary based upon the channel bandwidths initially selected by the RF filters 202-206.

While various functions and components are described herein as being performed by or being included in the signal processor 116, it is to be understood that other functions or components may be performed by or included in the signal processor 116. By way of example, the signal processor 116 can include filters, ADCs, mixers, and other devices that are configured to perform functions that are described herein as being performed by such devices. In exemplary embodiments, the signal processor 116 comprises an application-specific integrated circuit (ASIC), an FPGA, a computing device, etc.

Figure 7:
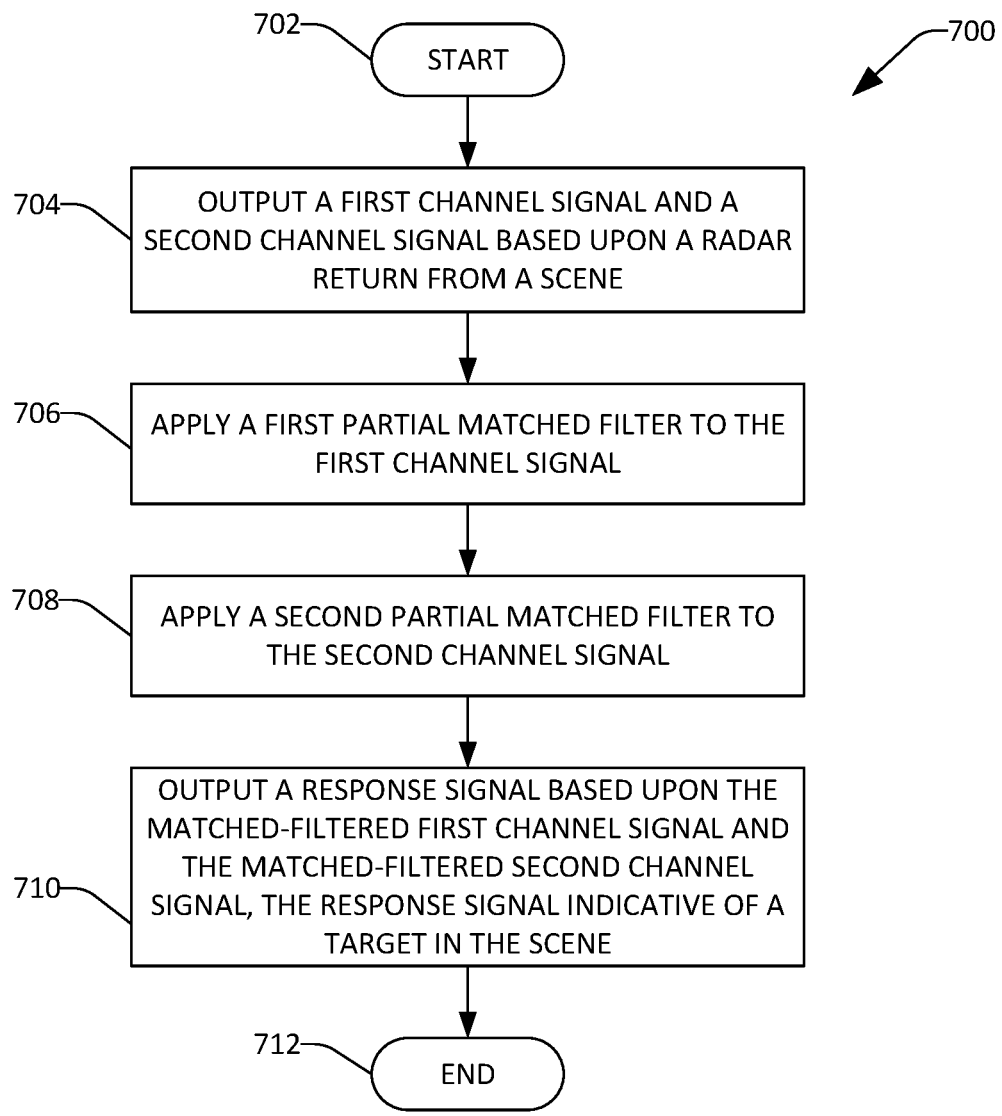
FIG. 7 is a flow diagram that illustrates an exemplary methodology for matched-filtering a channelized signal.
Figure 8:
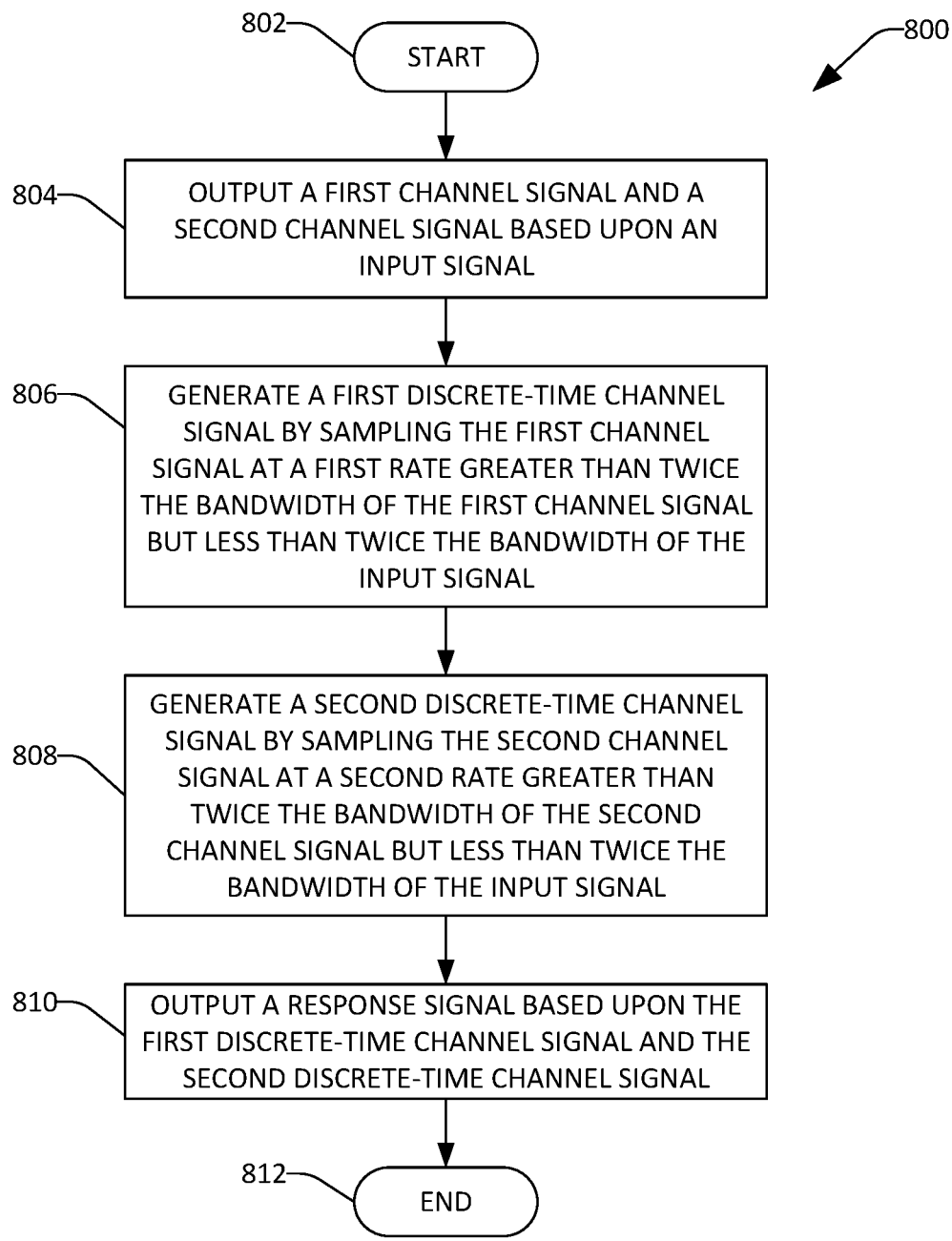
FIG. 8 is a flow diagram that illustrates an exemplary methodology for sampling an input signal below the Nyquist rate of the input signal.
Figure 9:
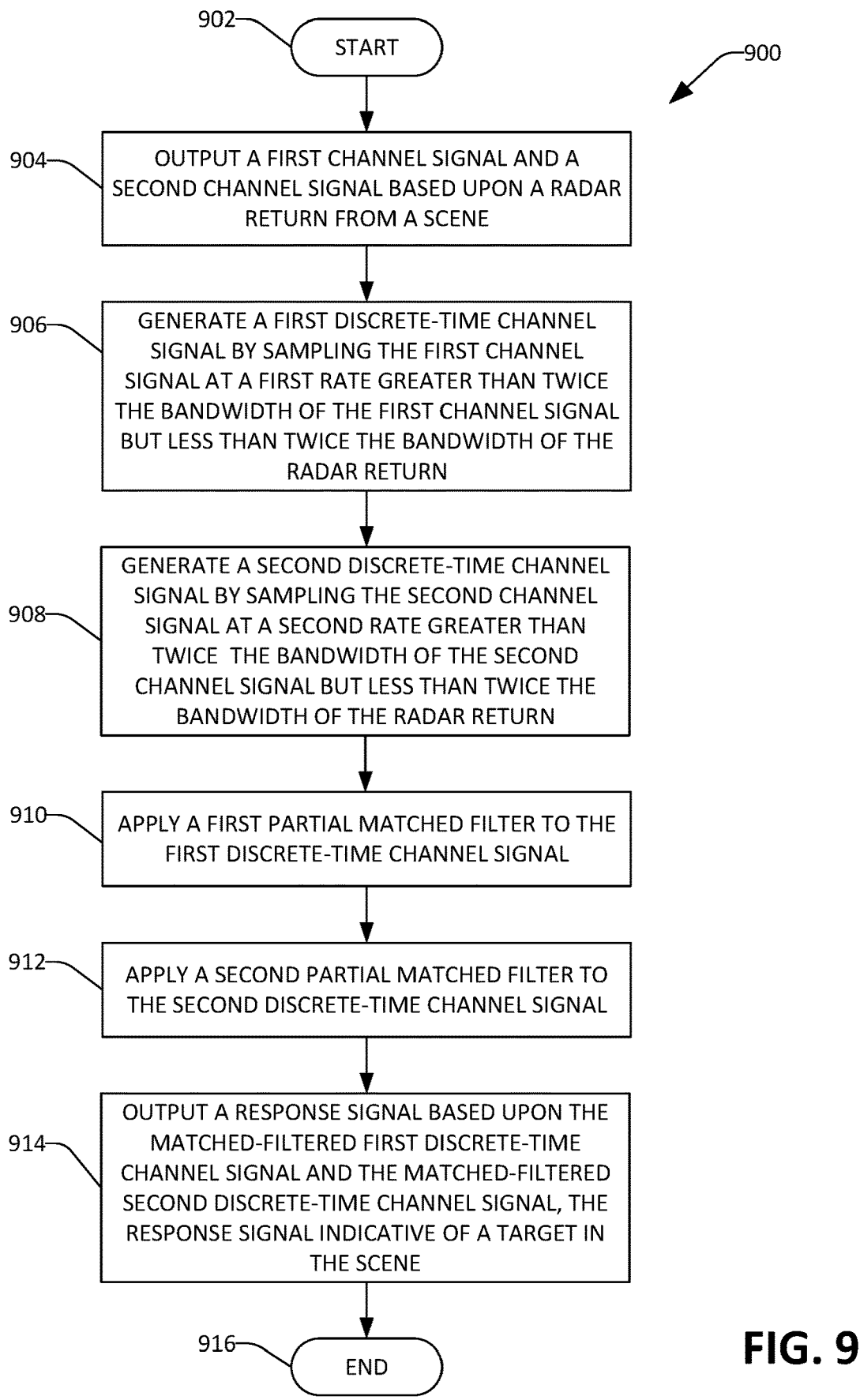
FIG. 9 is a flow diagram that illustrates an exemplary methodology for generating a response signal for a radar return.

FIGS. 7-9 illustrate exemplary methodologies relating to various signal processing technologies that facilitate generating an impulse response of a system by channelization of an input signal according to frequency. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein. It is also to be understood that while certain methodologies are described herein relative to first and second channels, or first and second channel signals, the methodologies described herein can be performed relative to substantially any number of channels or channel signals.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, a methodology 700 that facilitates generating a response signal for a radar return by partial matched filtering is illustrated. The methodology 700 begins at 702, and at 704 a first channel signal and a second channel signal are output based upon a radar return from a scene. The radar return can be or include an electrical signal output by a radar receiver antenna responsive to receiving electromagnetic radiation reflected from objects in the scene. The first channel signal is representative of the radar return for first frequencies in the bandwidth of the radar return. The second channel signal is representative of the radar return for second frequencies in the bandwidth of the radar return, where the second frequencies include at least some of the first frequencies. In an exemplary embodiment, the first channel signal can be output by way of a first filter configured to pass the first frequencies and the second channel signal can be output by way of a second filter configured to pass the second frequencies. At 706 a first partial matched filter is applied to the first channel signal. At 708, a second partial matched filter is applied to the second channel signal. By way of example, the partial matched filters can be based on a complete matched filter defined over the bandwidth of the radar return (e.g., as set forth above with respect to the calibrated matched filter). At 710 a response signal is output based on the matched-filtered first channel signal and the matched-filtered second channel signal, where the response signal is indicative of a target in the scene. The methodology 700 ends at 712.

Referring now to FIG. 8, a methodology 800 that facilitates generating a response signal responsive to receipt of an input signal by channelizing the input signal and sampling the channels at a rate less than twice the bandwidth of the input signal is illustrated. The methodology 800 begins at 802, and at 804, a first channel signal and a second channel signal are output based upon the input signal. The first channel signal is representative of the input signal for first frequencies in the bandwidth of the input signal and the second channel signal is representative of the input signal for second frequencies in the bandwidth, where the second frequencies include at least some of the first frequencies. At 806, a first discrete-time channel signal is generated by sampling the first channel signal at a first rate that is less than twice the bandwidth of the input signal. At 808, a second discrete-time channel signal is generated by sampling the second channel signal at a second rate that is less than twice the bandwidth of the input signal. In various embodiments, in order to avoid aliasing in the sampling of the first and second channel signals the first sampling rate is greater than twice the bandwidth of the first channel signal and the second sampling rate is greater than twice the bandwidth of the second channel signal. At 810, a response signal is output based upon the first discrete-time channel signal and the second discrete-time channel signal, whereupon the methodology 800 completes 812.

Referring now to FIG. 9, a methodology 900 that facilitates generating a response signal for a radar return is illustrated. The methodology 900 begins at 902 and at 904 a first channel signal and a second channel signal are output based upon a radar return from a scene. In exemplary embodiments, the first channel signal and the second channel signal are output by respective first and second filters, where the first filter and the second filter have a first bandwidth and a second bandwidth, respectively. At 906, a first discrete-time channel signal is generated by sampling the first channel signal at a first rate that is less than twice the bandwidth of the radar return. At 908, a second discrete-time channel signal is generated by sampling the second channel signal at a second rate that is less than twice the bandwidth of the radar return. In various embodiments, in order to avoid aliasing in the sampling of the first and second channel signals the first sampling rate is greater than twice the bandwidth of the first channel signal and the second sampling rate is greater than twice the bandwidth of the second channel signal.

The methodology proceeds to 910, where a first partial matched filter is applied to the first discrete-time channel signal (e.g., as described above with respect to partial matched filter $MF_x$). At 912, a second partial matched filter is applied to the second discrete-time channel signal. A response signal is output based upon the matched-filtered discrete-time channel signals, where the response signal is indicative of a target in the scene, and the methodology completes 916.

Figure 10:
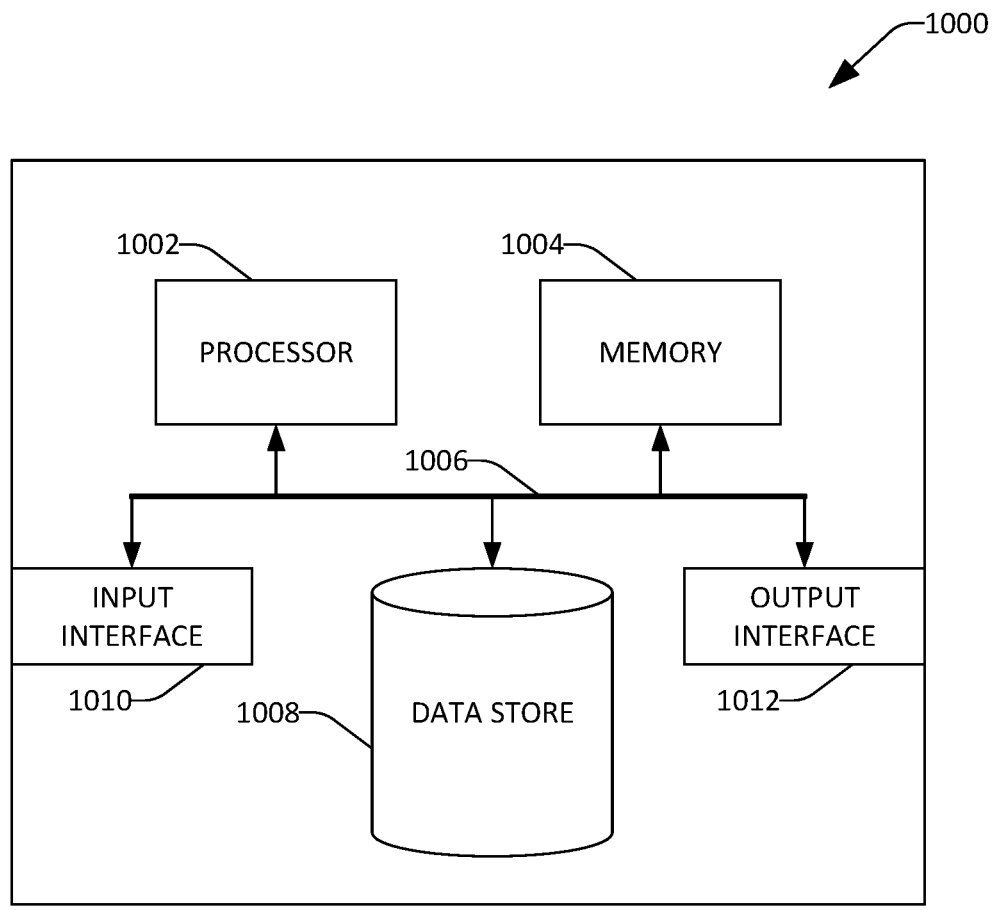
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a radar system to perform various signal processing operations during operation of the radar system or to control various aspects of the radar system. By way of another example, the computing device 1000 can be used in a system that aids in calibration of a radar system or generating calibrated matched filters for a radar system. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store matched filter data, signal data, etc.

The computing device 1000 additionally includes a data store 1008 that is accessible by the processor 1002 by way of the system bus 1006. The data store 1008 may include executable instructions, matched filter data, signals data etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include FPGAs, ASICs, Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
responsive to receipt of a radar return from a scene, the radar return having a bandwidth comprising a plurality of frequencies, outputting a first channel signal and a second channel signal, the first channel signal representative of the radar return for first frequencies in the frequencies, the second channel signal representative of the signal for second frequencies in the frequencies, the first frequencies including at least some of the second frequencies;

applying a first partial matched filter to the first channel signal;

applying a second partial matched filter to the second channel signal; and outputting a response signal based upon the matched-filtered first channel signal and the matched-filtered second channel signal, the response signal indicative of a target in the scene.

2. The method of claim 1, wherein the first partial matched filter is based upon the first frequencies and the second partial matched filter is based upon the second frequencies.

3. The method of claim 1, wherein the radar return comprises an echo of a radar signal transmitted toward the scene.

4. The method of claim 3, further comprising prior to the radar signal being transmitted toward the scene, computing a calibrated matched filter based upon a test signal, wherein the test signal is the same signal as the radar signal.

5. The method of claim 4, wherein the first partial matched filter and the second partial matched filter are based upon the calibrated matched filter.

6. The method of claim 1, the first partial matched filter and the second partial matched filter based upon a complete matched filter defined over the bandwidth.

7. The method of claim 6, the first partial matched filter taking first values for the first frequencies and taking zeros for all other frequencies in the bandwidth.

8. The method of claim 7, the second partial matched filter taking second values for the second frequencies and taking zeros for all other frequencies in the bandwidth.

9. The method of claim 1, wherein the first channel signal and the second channel signal are output by way of a first bandpass filter and a second bandpass filter, respectively.

10. The method of claim 1, further comprising:

prior to applying the first partial matched filter to the first channel signal, digitally sampling the first channel signal by way of a first analog-to-digital converter (ADC); and prior to applying the second partial matched filter to the second channel signal, digitally sampling the second channel signal by way of a second ADC.

11. The method of claim 10, wherein the first ADC and the second ADC have respective sampling rates that are less than twice the bandwidth of the radar return.

12. A signal processing system configured to perform acts comprising:

responsive to receipt of an input signal having a bandwidth, outputting a first channel signal and a second channel signal, the first channel signal representative of the signal for first frequencies in the bandwidth, the second channel signal representative of the signal for second frequencies in the bandwidth, the first frequencies including at least some of the second frequencies;

generating a first discrete-time channel signal by sampling the first channel signal at a first rate that is less than twice the bandwidth of the input signal;

generating a second discrete-time channel signal by sampling the second channel signal at a second rate that is less than twice the bandwidth of the input signal; and outputting a response signal based upon the first discrete-time channel signal and the second discrete-time channel signal.

13. The signal processing system of claim 12, wherein outputting the response signal is based upon applying a first partial matched filter to the first discrete-time channel signal and applying a second partial matched filter to the second discrete-time channel signal.

14. The signal processing system of claim 13, wherein the first partial matched filter is based upon the first frequencies and the second partial matched filter is based upon the second frequencies.

15. The signal processing system of claim 13, the first partial matched filter and the second partial matched filter based upon a complete matched filter defined over the bandwidth.

16. The signal processing system of claim 15, the first partial matched filter taking first values for the first frequencies and taking zeros for all other frequencies in the bandwidth.

17. The signal processing system of claim 16, the second partial matched filter taking second values for the second frequencies and taking zeros for all other frequencies in the bandwidth.

18. The signal processing system of claim 12, wherein the input signal is a radar return.

19. The signal processing system of claim 12, wherein the first channel signal is output by way of a first filter configured to pass the first frequencies and the second channel signal is output by way of a second filter configured to pass the second frequencies.

20. A system comprising:

a radar transmitter that emits a radar signal toward a scene; and a radar receiver that receives a return echo of the radar signal emitted by the trader transmitter, the radar receiver configured to perform the following acts:

responsive to receipt of an input signal having a bandwidth, outputting a first channel signal and a second channel signal, the first channel signal representative of the signal for first frequencies in the bandwidth, the second channel signal representative of the signal for second frequencies in the bandwidth, the first frequencies including at least some of the second frequencies;

generating a first discrete-time channel signal by sampling the first channel signal at a first rate that is less than twice the bandwidth of the input signal;

generating a second discrete-time channel signal by sampling the second channel signal at a second rate that is less than twice the bandwidth of the input signal; and outputting a response signal based upon applying a first partial matched filter to the first discrete-time channel signal and applying a second partial matched filter to the second discrete-time channel signal, the response signal indicative of a target in the scene.

* * * * *